US011582955B2

(12) United States Patent
Endresen et al.

(10) Patent No.: US 11,582,955 B2
(45) Date of Patent: Feb. 21, 2023

(54) FLOATABLE FISH TANK HAVING WORKING FLOOR

(71) Applicant: Marad Norway AS, Bølandet (NO)

(72) Inventors: Bjørn Ove Endresen, Bølandet (NO); Aasmund Sveinung Torvik, Bølandet (NO); Bård Rune Kvalsund, Fosnavåg (NO)

(73) Assignee: Marad Norway AS, Bølandet (NO)

( * ) Notice: Subject to any disclaimer, the term of this patent is extended or adjusted under 35 U.S.C. 154(b) by 39 days.

(21) Appl. No.: 16/625,593

(22) PCT Filed: Jul. 31, 2018

(86) PCT No.: PCT/NO2018/050201
§ 371 (c)(1),
(2) Date: Dec. 20, 2019

(87) PCT Pub. No.: WO2019/027332
PCT Pub. Date: Feb. 7, 2019

(65) Prior Publication Data
US 2020/0196579 A1 Jun. 25, 2020

(30) Foreign Application Priority Data
Jul. 31, 2017 (NO) .................................. 20171271

(51) Int. Cl.
A01K 61/60 (2017.01)
A01K 61/13 (2017.01)
(52) U.S. Cl.
CPC .............. A01K 61/60 (2017.01); A01K 61/13 (2017.01); A01K 2227/40 (2013.01)

(58) Field of Classification Search
CPC ........ A01K 61/10; A01K 61/13; A01K 61/60; A01K 2227/40
USPC ......................................... 119/215, 223, 226
See application file for complete search history.

(56) References Cited

U.S. PATENT DOCUMENTS

| 3,668,051 A * | 6/1972 | Seemann, III ............ B63B 5/16 428/114 |
| 3,804,063 A * | 4/1974 | Finger .................... A01K 61/00 119/226 |
| 4,666,356 A * | 5/1987 | Newbury ........... B65D 21/0209 414/788.2 |
| 4,798,168 A * | 1/1989 | Vadseth ................. A01K 61/60 119/223 |

(Continued)

FOREIGN PATENT DOCUMENTS

| CN | 100512635 C | 7/2009 |
| CN | 106508766 A | 3/2017 |

(Continued)

OTHER PUBLICATIONS

International Search Report and Written Opinion issued in International Patent Application No. PCT/NO2018/050201 dated Nov. 19, 2018.

Primary Examiner — Brady W Frazier
(74) Attorney, Agent, or Firm — Arent Fox LLP

(57) ABSTRACT

A floatable fish tank comprising: a hull having a lower part with side and bottom walls, the lower part forming an enclosure for fish; a deck arranged at an upper part of the hull; a central column fixed within the hull, wherein the central column is closed at its lower end section and extends from the bottom wall to the deck.

20 Claims, 8 Drawing Sheets

(56) References Cited

U.S. PATENT DOCUMENTS

| | | | | |
|---|---|---|---|---|
| 4,854,256 | A * | 8/1989 | Hayashi | B63B 35/44 114/61.1 |
| 5,359,962 | A | 11/1994 | Loverich | |
| 5,617,813 | A * | 4/1997 | Loverich | A01K 61/60 119/223 |
| 6,016,767 | A * | 1/2000 | Kyrkjeb.o slashed. | A01K 61/80 119/51.04 |
| 8,387,550 | B2 * | 3/2013 | Mansour | B63B 35/44 114/265 |
| 8,506,811 | B2 * | 8/2013 | Bradley | C02F 1/74 210/620 |
| 9,072,282 | B2 | 7/2015 | Madsen | A01K 79/00 |
| 10,123,516 | B2 * | 11/2018 | Robinson | A01K 61/60 |
| 10,206,376 | B1 * | 2/2019 | Lyngoy | A01K 61/80 |
| 2012/0117850 | A1 * | 5/2012 | Panovic | A01K 79/00 43/4.5 |
| 2013/0284105 | A1 | 10/2013 | Han et al. | |
| 2015/0150223 | A1 | 6/2015 | Robinson | |
| 2020/0077630 | A1 * | 3/2020 | N.ae butted.ss | A01K 61/60 |

FOREIGN PATENT DOCUMENTS

| | | | | |
|---|---|---|---|---|
| CN | 106585893 | A * | 4/2017 | A01K 69/08 |
| CN | 106741572 | A * | 5/2017 | A01K 75/00 |
| CN | 105557572 | B * | 8/2018 | A01K 61/60 |
| EP | 0347489 | B1 * | 3/1992 | A01K 61/60 |
| EP | 1969925 | A1 | 9/2008 | |
| FR | 2596613 | A1 | 10/1987 | |
| FR | 2862276 | A1 * | 5/2005 | A01K 61/60 |
| GB | 2031251 | A | 4/1980 | |
| JP | H0624458 | B2 | 4/1994 | |
| KR | 100770385 | B1 * | 10/2007 | A01K 61/60 |
| NO | 312873 | B1 | 7/2002 | |
| NO | 340712 | B1 | 6/2017 | |
| WO | 2012092380 | A2 | 7/2012 | |
| WO | 2015099540 | A1 | 7/2015 | |
| WO | WO-2016052967 | A1 * | 4/2016 | A01K 61/65 |
| WO | WO-2016128981 | A1 * | 8/2016 | A01K 61/60 |
| WO | 2017026899 | A1 | 2/2017 | |
| WO | WO-2017091079 | A1 * | 6/2017 | A01K 61/60 |
| WO | WO-2018229123 | A1 * | 12/2018 | A01K 61/60 |

* cited by examiner

FLOATABLE FISH TANK HAVING WORKING FLOOR

CROSS-REFERENCE TO RELATED APPLICATION

This application is a 35 U.S.C. § 371 National Phase Application of PCT Application No. PCT/NO2018/050201 filed Jul. 31, 2018, which claims priority to Norwegian Patent Application No. NO 20171271, filed Jul. 31, 2017, the disclosure of which is incorporated in its entirety herein by reference.

The present invention relates to a fish farm, and more particularly to a fish farm for farming of aquatic animals such as Atlantic salmon.

BACKGROUND

Fish farming has grown rapidly over the recent decades and now forms a significant industry with substantial economic value in many countries. Along with the growth of this industry, there has been a development in the regulatory framework for the industry, in relation to, among other things, animal welfare, work safety and environmental impact. One such issue relates to the local environmental impact of fish farms, with continuously increasing production volumes. Another often debated aspect is the prevention of animal disease and spreading of parasites (such as sea lice).

One solution which has been proposed to address these issues is closed offshore fish farms, i.e. pens which are not open towards, and thus do not freely exchange water with, the surrounding seawater. Despite a variety of concepts having been proposed, such closed fish farms are not currently commercially used to any notable extent. Some examples and other documents which can be useful for understanding the background include: WO 2017/026899 A1 EP 1969925 A1 CN 100512635 C; U.S. Pat. No. 5,359,962 A; GB 2031251 A; NO 312873 B1; WO 2015/099540 A1 WO 2012/092380 A2; JP H0624458 B; FR 2596613 A; US 2013284105 A1 and NO 340712.

There is consequently a need for improved technology to enable safe and sustainable fish farming. The present inventors are involved in the development of such technology, and the present invention has the objective to provide a fish farm which provides advantages over known solutions and techniques in the abovementioned or other areas.

SUMMARY

In an embodiment, there is provided a floatable fish tank comprising: a hull having a lower part with side and bottom walls, the lower part forming an enclosure for fish; a deck arranged at an upper part of the hull; a central column fixed within the hull, wherein the central column is closed at its lower end section and extends from the bottom wall to the deck.

The appended dependent claims outline further embodiments.

BRIEF DESCRIPTION OF THE DRAWINGS

Illustrative embodiments of the present invention will now be described with reference to the appended drawings, in which.

DETAILED DESCRIPTION

Figure 1:
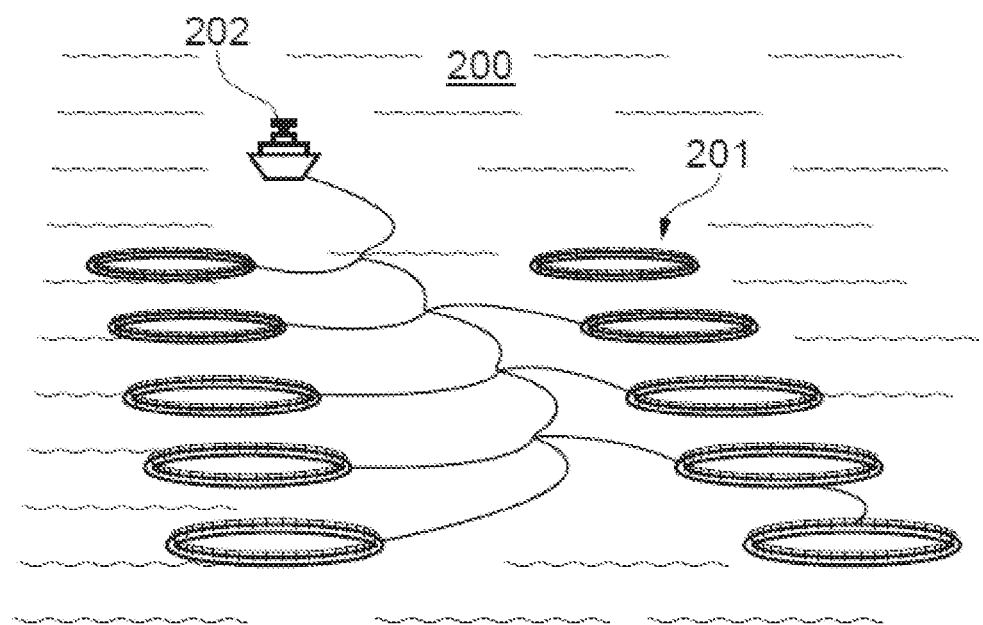
FIG. 1 shows a fish farm according to the prior art.

FIG. 1 shows a conventional fish farm 200, comprising a plurality of pens 201 floating in the sea, each pen having a fish enclosure made up of a continuous net suspended from a ring-formed floatation element. The net is free to exchange water with the surroundings. Feeding is typically done via pipes from a feeding barge 202, but may also be done in alternative ways, such as from a workboat.

Figure 2A:
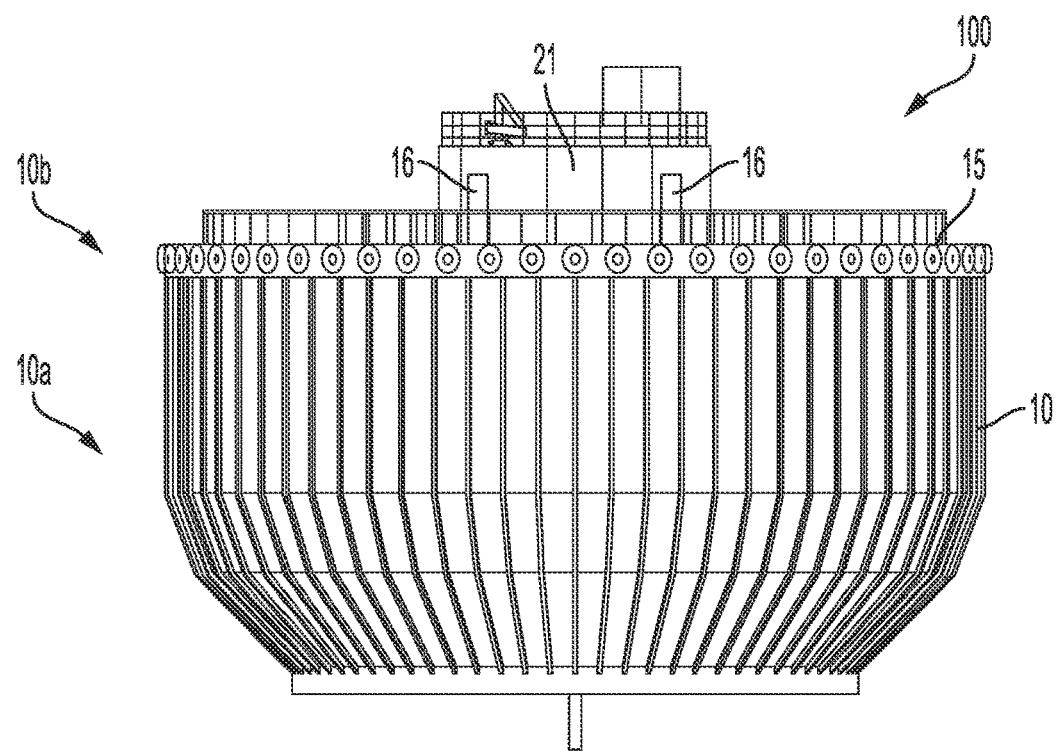
FIGS. 2A and 2B show a floatable fish tank according to an embodiment.
Figure 2B:
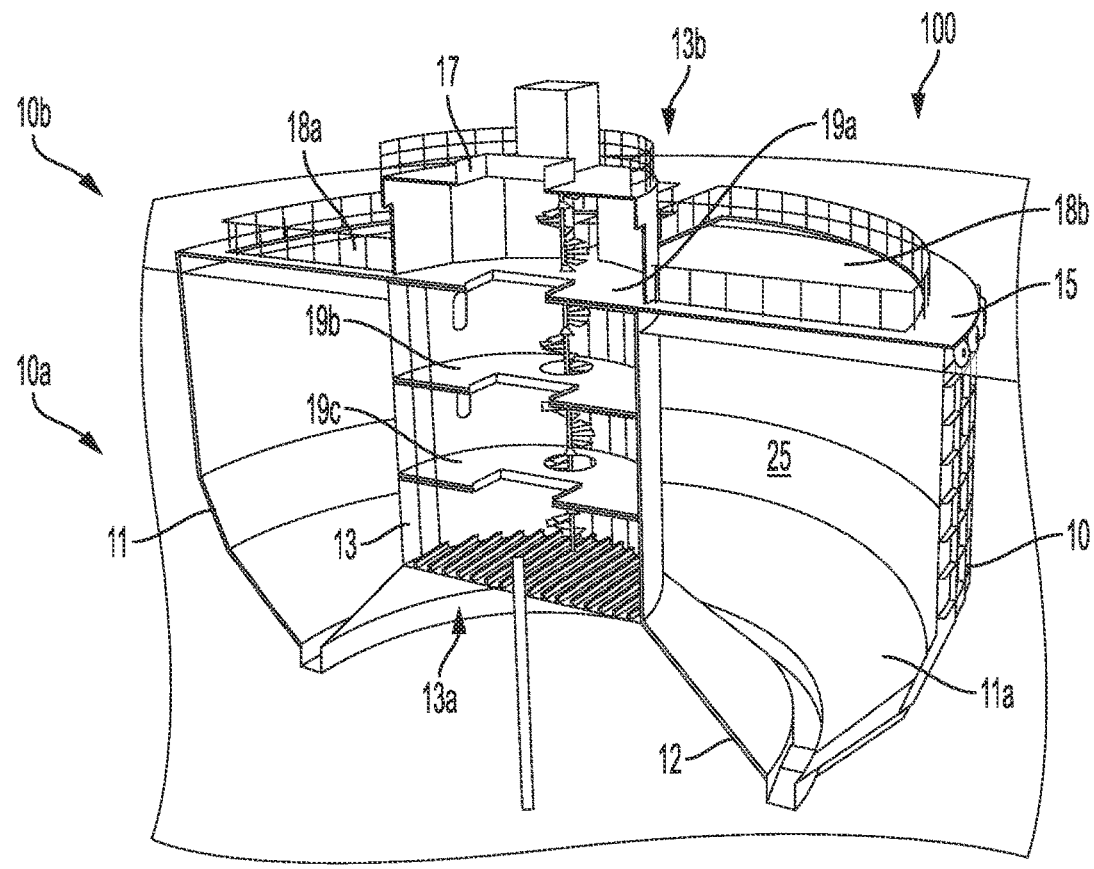

In an embodiment according to the present invention, illustrated in FIGS. 2A and 2B, there is provided a fish tank 100. The fish tank 100 is floatable, i.e. it has positive buoyancy and is capable of floating in water. The fish tank 100 has a hull 10 with a lower part 10a, which has side and bottom walls 11,12. In the embodiment shown in FIGS. 2A and 2B, the side and bottom walls 11,12 are water tight. The lower part 10a thus forms an enclosure 25 for fish which is water tight against surrounding seawater, whereby exchange of water is prevented. Alternatively, the enclosure 25 may be partially or selectively closed, for example with the side and/or bottom walls 11,12 comprising a grid structure or a net at parts of the walls 11,12, or having hatches or the like which can be selectively opened for exchange of water between the enclosure and the sea. The side walls 11 may, for example, be water tight in its upper part, to prevent the enclosure 25 from exchanging water with the upper layers of the sea water which typically have a higher concentration of parasites, such as sea lice.

A deck 15 is arranged at an upper part 10b of the hull 10. In the normal, floating position, the deck 15 will be above water and provides a work space on the fish tank 100.

As can be seen in FIG. 2B, a central column 13 is fixed within the hull 10 and extends from the bottom wall 12 to the deck 15. The central column 13 is closed at its lower end section 13a so that fluid communication between the enclosure 25 or the surrounding sea water and the inner space of the column 13 is prevented. The column 13 thus effectively provides a ballast tank or buoyancy element within the hull 10. The column 13 can be designed with a size such that it provides a buoyancy which is higher than the weight of the fish tank 100, i.e. the column 13 provides the entire buoyancy for the fish tank 100, or it can provide a part of the buoyancy and additional buoyancy can be provided by e.g. additional floatation elements and/or a gas-filed space within a double hull (see below).

In use, the enclosure 25 is filled with water and fish can be farmed and/or stored in the fish tank 100 while the fish tank 100 floats at sea. The fish tank 100 may be moored in place at a desired location using conventional methods. With water tight walls, exchange of water between the enclosure 25 and the surrounding seawater is prevented, such that no waste (e.g. detritus) will reach the surrounding environment, and the fish is protected from e.g. parasites (such as sea lice) in the surrounding seawater.

Water in the enclosure 25 may be replaced by appropriate pump systems, whereby fresh seawater may be provided from the surroundings and provided to the tank, and spent water may be discharged. This water may be subjected to water treatment, for example filtering to remove any parasites in incoming water, and cleaning of debris from water being discharged. An oxygenation system may be provided to control and ensure a sufficient oxygen content in the water in the enclosure, and other monitoring and/or control systems may also be employed to maintain a desired water quality or control other parameters.

The central column 13 may extend through the deck 15 such as to provide a housing 21 accessible from the deck 15. The housing 21 may, for example, be used as office space or to house various equipment used in the operation of the fish tank 100. Alternatively, the housing 21 may be provided by a separate building for this purpose (see below), arranged on the deck 15.

The central column 13 may have openings at its upper end section. In the embodiment shown, doors 16 are provided to give access to the housing 21 and the central column 13. A top opening 17 is further provided at the top end of the housing 21. The top opening 17 permits, for example, provision of equipment or consumables (such as fish feed) into the central column 13 via a crane from above the top opening 17.

As can be seen in FIG. 2B, the central column 13 comprises a plurality of working floors 19a-c in its inner volume. The working floors 19a-c are accessible via the opening(s) 16,17 and stairs or equivalent may be arranged between the floors 19a-c. The working floors 19a-c may comprise windows to the inside of the enclosure 25, in order to allow inspection and monitoring of the enclosure 25. Similarly, the working floors 19a-c may be arranged with access to the enclosure 25 to carry out tests or install sensor systems in to the enclosure 25. Such testing or monitoring can, if desirable, be arranged and carried out at different heights in the enclosure 25.

The floors 19a-c allow operating equipment or consumables (such as fish feed) to be provided into and/or stored in the central column 13. The operating equipment may be, for example, a feed storage, a feed distribution system, one or more pumps, a power generator, office utilities, a fluid conditioning system or a waste treatment system. Sufficient equipment may thus be provided so that the fish tank 100 makes up a complete, self-supported unit for its operation.

The deck 15 comprises a plurality of openings 18a,18b. The openings 18a,18b allows access to the enclosure 25 from above, for example for inspection or operations such as feeding, removal of fish for sampling purposes, or the like. In addition, openings 18a,b can provide ambient light to the interior of the enclosure 25. Alternatively, the deck 15 may be fully closed to prevent access to the enclosure 25 from above. This may, for example, be beneficial to protect the water in the enclosure 25 and the fish from predators, infections or contamination. In an alternative embodiment, hatches could be arranged above the openings 18a,b so as to allow selective access to the enclosure 25, while closing the hatches allows the deck 15 to be fully closed. Internal lighting in the enclosure 25 can be arranged to control light levels for the fish. If the working floors 19a-c are equipped with windows, or the enclosure 25 comprises cameras or other surveillance arrangements, lighting in the enclosure 25 will benefit such surveillance.

Figure 3A:
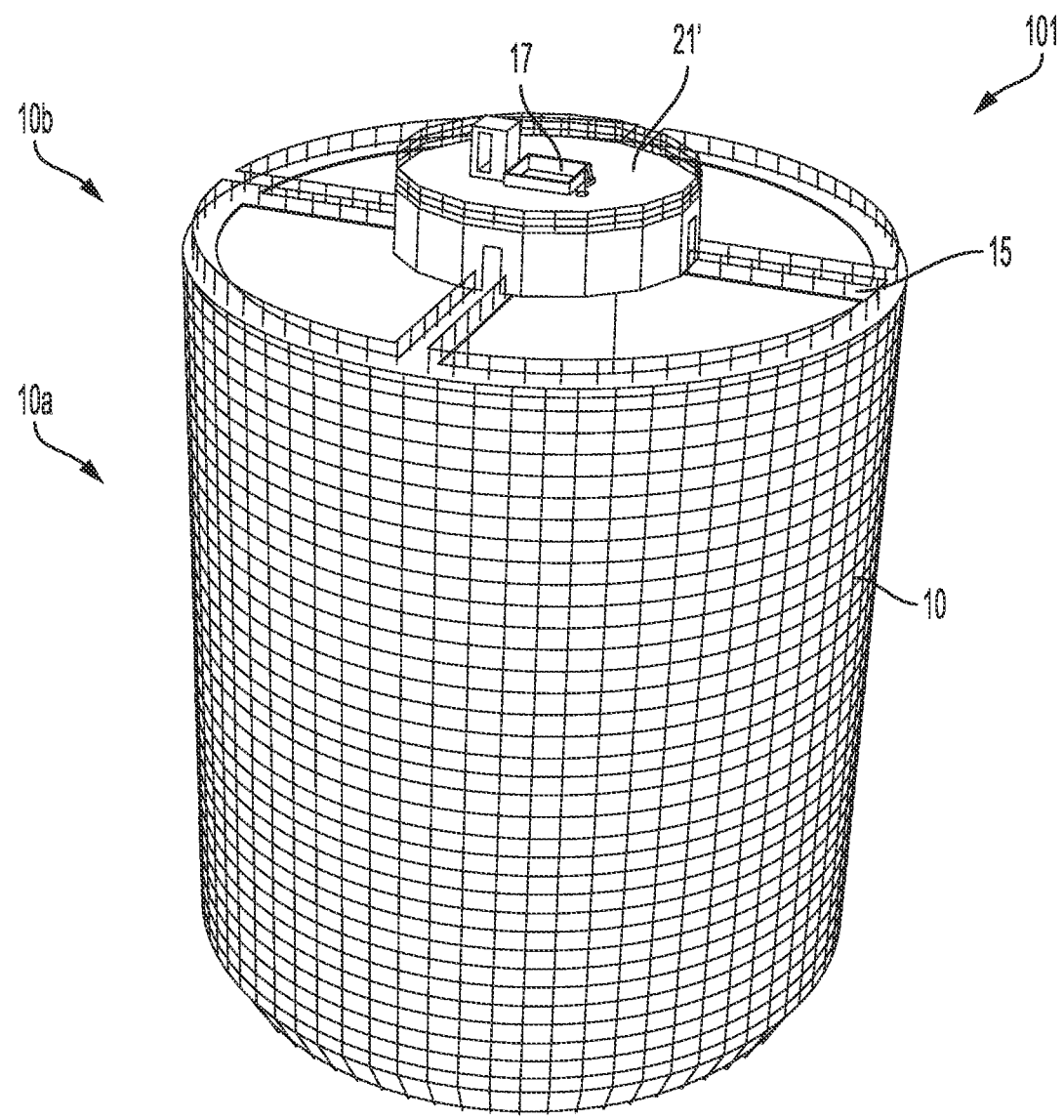
FIGS. 3A and 3B show a floatable fish tank according to an embodiment.
Figure 3B:
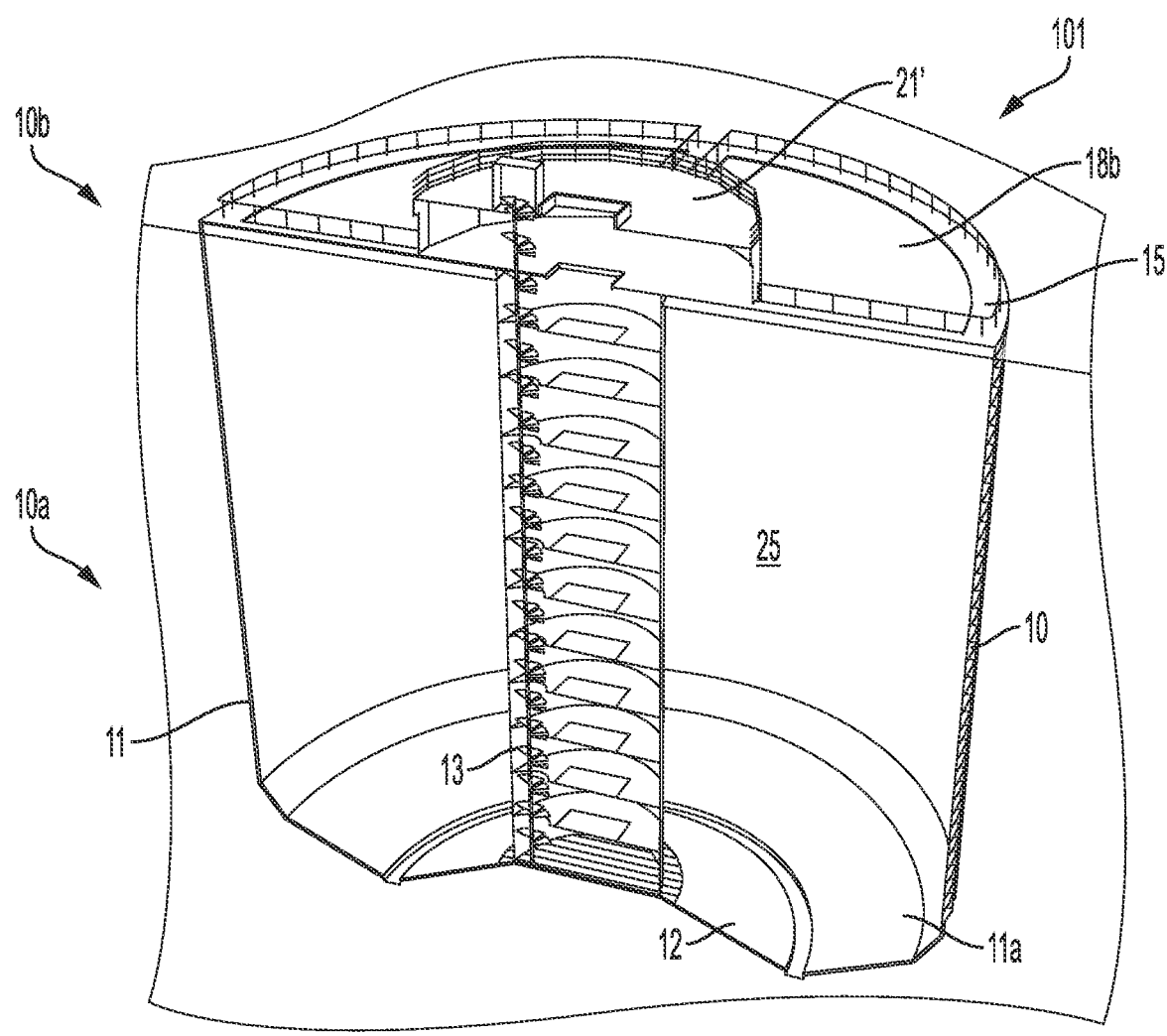

FIGS. 3A and 3B show another embodiment of a fish tank 101. In this embodiment, the fish tank 101 has a different size, but is generally of similar design to the fish tank 100 shown in FIGS. 2A and 2B and comprising the same elements.

In FIGS. 3A and 3B, the fish tank 101 comprises a building 21' arranged on the deck 15. The building 21' can, for example, house one or more of an office space, a feed storage, a feed distribution system, pumps, power generators, office utilities, a fluid conditioning system, a waste treatment system, or other equipment.

The fish tank 100 and 101 is advantageously arranged with an even inner surface 11a of the side and bottom walls 11,12. This reduces the risk of damage to the fish or to equipment used in the tank 100,101, and eases cleaning of the tank 100,101.

Figure 4:
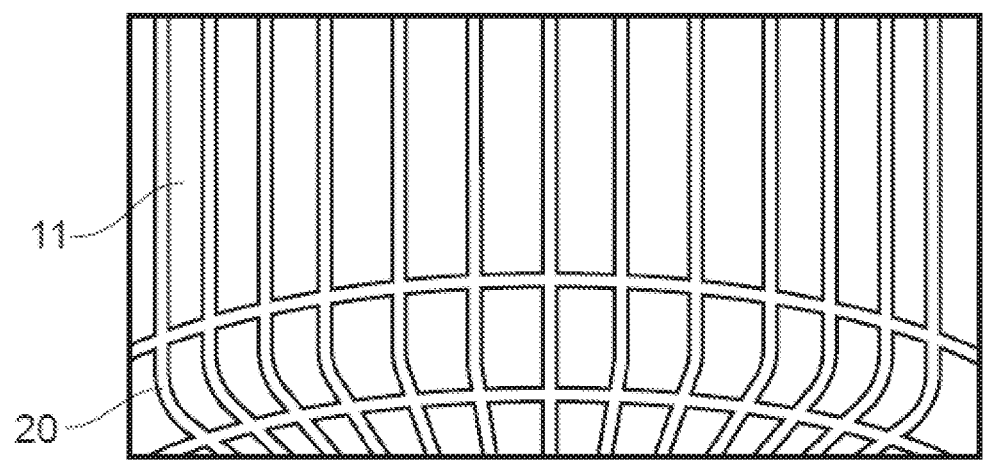
FIG. 4 shows certain aspects of a floatable fish tank according to an embodiment.

FIG. 4 shows certain aspects of an embodiment, in which the side wall 11 is provided with a strengthening frame 20 arranged on its outer surface. The strengthening frame 20 may be made up of crossbeams fixed to the side wall 11, for example by means of welding. The strengthening frame 20 allows the structural strength of the overall tank 100,101 to be improved. By providing the strengthening frame 20 on the outside of the side wall 11, the strengthening elements do not interfere with the conditions for the fish in the enclosure 25 and also do not significantly influence the operation of the tank 100,101, for example in relation to cleaning the inner surface 11a. The bottom wall 12 (see FIGS. 2B and 3B) may be arranged with a similar strengthening frame on its outward-facing surface. If found more convenient, the construction may also be done according to conventional double hull principles, allowing both the inside and the outside to have smooth surfaces. All strengthening will then be inside the double hull tanks.

FIGS. 5A-E show another embodiment of a fish tank 102. In this embodiment, there is provided a combined vessel docking and floatation element 30 arranged on an outside of the upper part 10b of the hull 10. The vessel docking and floatation element 30 can provide additional buoyancy, as well as access to the fish tank 102 from a vessel, such as a workboat or a supply vessel for e.g. fish feed or other consumables. A top surface of the vessel docking and floatation element 30 may also be arranged flush with the deck 15 and/or form part of the deck 15. In this embodiment, the vessel docking and floatation element 30 extends around the entire circumference of the hull 10, however the vessel docking and floatation element 30 may also be arranged only section-wise or partly around the hull 10. Optionally, only a vessel docking element or a floatation element may be used. For example, in certain cases one might not need additional buoyancy or vessel docking capability, or it is desirable to arrange a floatation element as a stand-alone unit, separate from the vessel docking element.

In the fish tank 102, the openings 18a,b are arranged within the building 21' on the deck 15. This provides protection of the openings 18a,b to prevent, for example, contamination of the water in the enclosure 25 or transfer of parasites into the enclosure 25 e.g. via sea spray and waves.

Figure 5A:
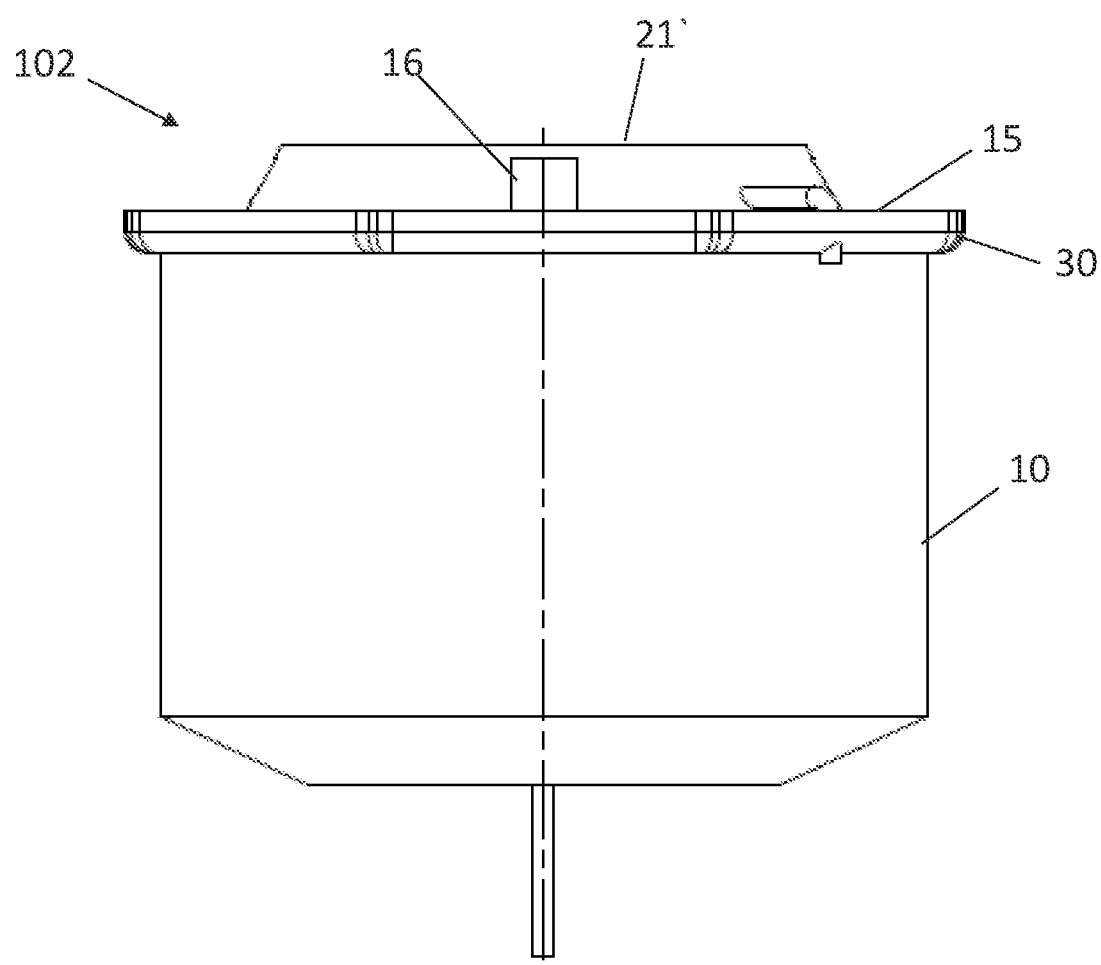
FIGS. 5A-E show a floatable fish tank according to an embodiment.
Figure 5B:
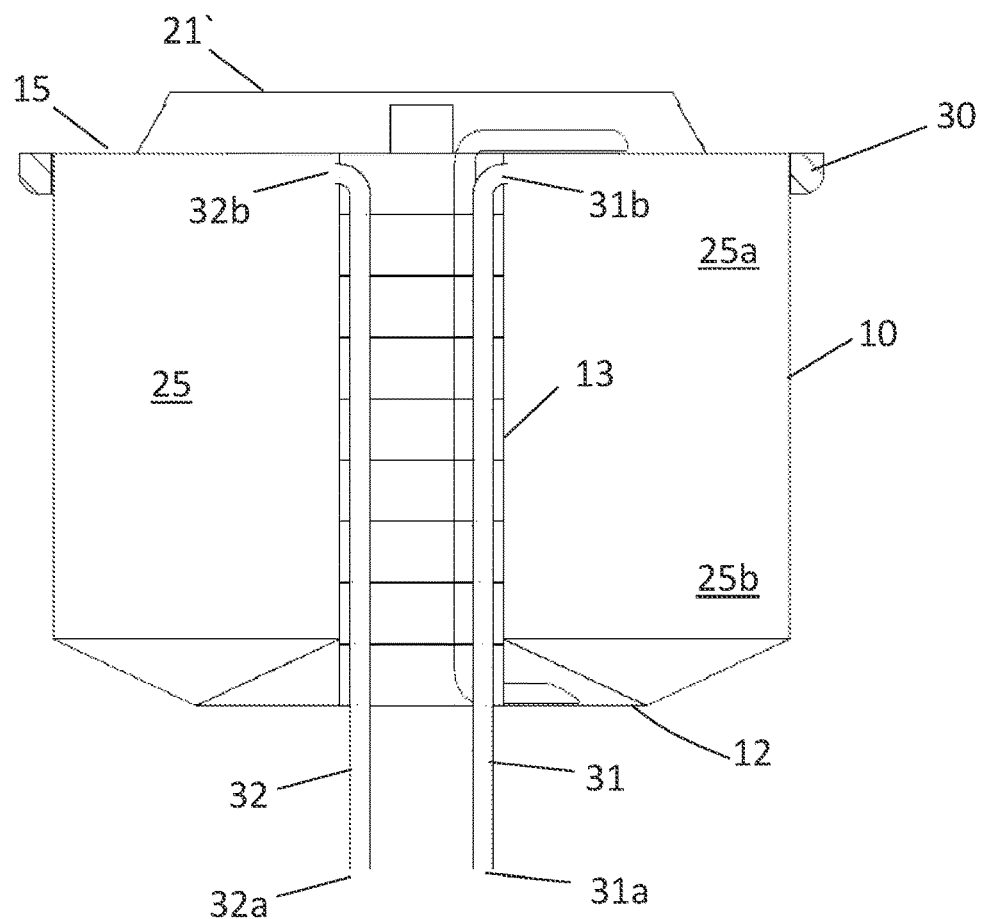
Figure 5C:
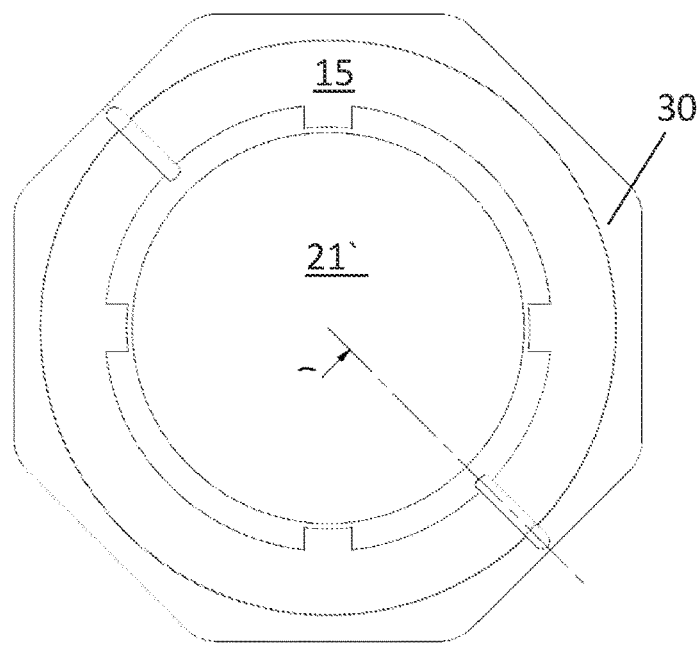

The embodiment shown in FIGS. 5A-E also shows possible arrangements of water supply or water removal pipes. Referring to FIG. 5B, supply pipes 31,32 may be arranged having openings 31a,32a to an outside of the hull 10 to pump in fresh seawater to the enclosure 25. Outlet opening 31b,32b of the supply pipes are arranged in the enclosure 25, in this case in the upper region 25a of the enclosure, however the outlet openings 31b,32b may also be arranged at a different height in the enclosure 25.

The supply pipes 31,32 may extend at least partially inside the central column 13. This provides the advantage that inline water treatment units or monitoring units positioned in the central column 13 can be connected to the supply pipes 31,32. For example, it may be desirable to connect a filtering unit to the supply pipes 31,32 in order to remove parasites (such as sea lice) from the intake water. Alternatively, or additionally, it may be desirable to monitor various parameters of the incoming water, such as temperature, salinity, etc. In this embodiment, this can be carried out by monitoring, sampling or measurement equipment in the central column 13.

Figure 5D:
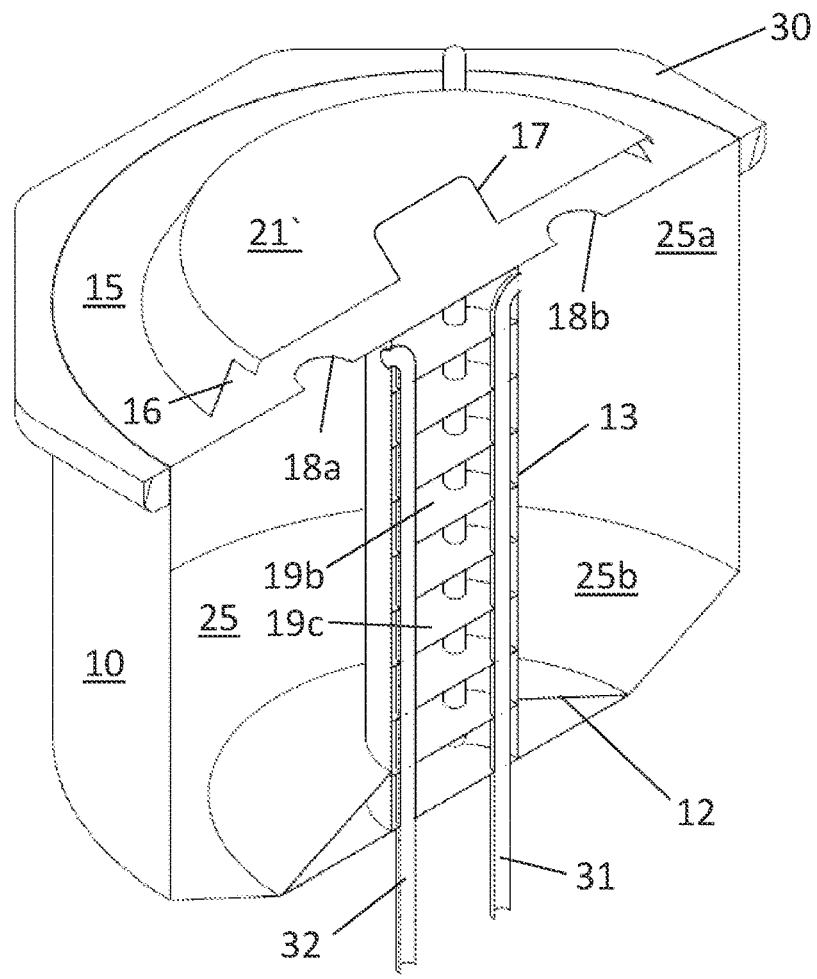

The intake openings 31a,32a may be located outside and below the hull 10, as can be seen in FIGS. 5B and 5D. In this embodiment, the pipes 31,32 extend through the bottom wall 12 and down into the sea below the hull 10. This provides the advantage that intake water can be collected at a deeper location, which may be advantageous for example in that there is lower concentration of parasites (such as sea lice) at such water depths, and the water at such depths may have a more beneficial temperature (for example, colder) compared to the water near the surface. For example, colder water may benefit fish welfare and disease control. Additionally, or alternatively, providing the intake water with a different temperature compared to the water in the enclosure 25 may benefit fluid flow in the enclosure 25, in that a natural convection and mixing of water will take place due to the temperature differences.

Figure 5E:
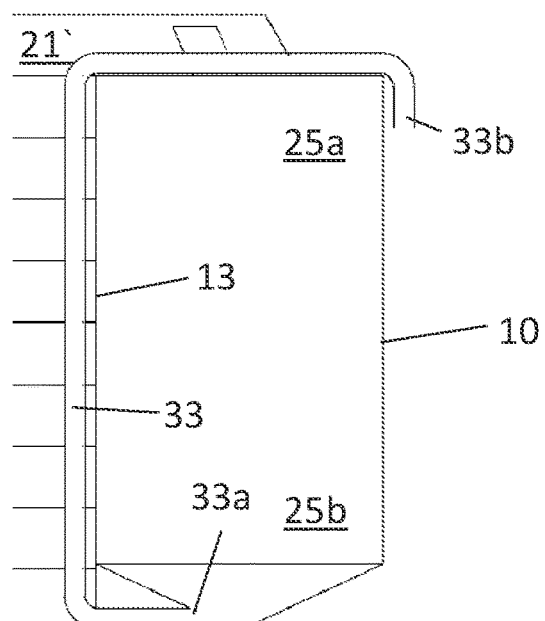

Referring to FIG. 5E, there may also be provided a discharge pipe 33, having an intake opening 33a to the enclosure 25 and an outlet opening 33b to the outside of the hull 10.

As for the supply pipes 31,32, the discharge pipe 33 may be arranged partly inside the central column 13. This allows, for example, processing equipment in the central column 13 to treat the water before discharge. It may for example be desirable to filter the discharge water in order to remove, e.g., feces or remains of fish feed, which may follow the discharge water out of the enclosure 25.

In the embodiment shown in FIGS. 5A-E, the intake opening 33a is located in a lower region 25b of the enclosure 25. Locating the intake opening 33a in the lower region 25b, preferably close to the bottom wall 12, provides advantages that feces or remains of fish feed will be removed from the enclosure 25 with the discharge water.

It should be understood that the water circulation and exchange as described above may be reversed, so that water is removed from the enclosure in the upper region 25a and added in the lower region 25b, should this be beneficial in a given operational circumstance. The supply pipes 31,32 will then function as discharge pipes, and the discharge pipe 33 will function as supply pipe. This may be the case, for example, in particular seasons with certain temperature levels in the intake water and the water in the enclosure 25 where it might be desirable to circulate water "bottom up" instead of "top down". The fish tank may comprise valve arrangements to allow the openings 31a,32a to communicate with opening 33a, and/or the openings 31b,32b to communicate with opening 33b, in order to obtain a good operational flexibility.

Figure 6A:
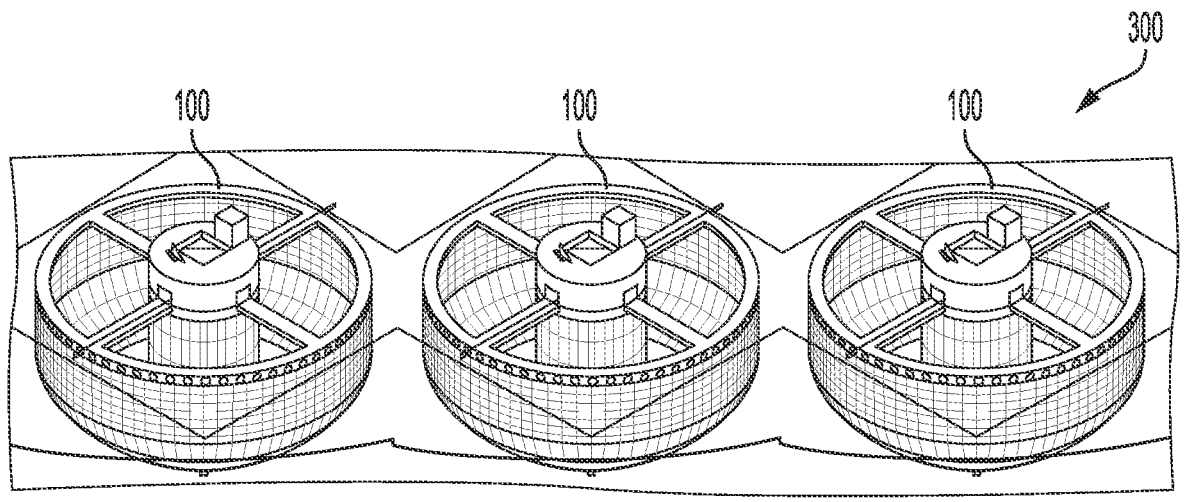
FIGS. 6A and 6B show fish farms according to an embodiment.
Figure 6B:
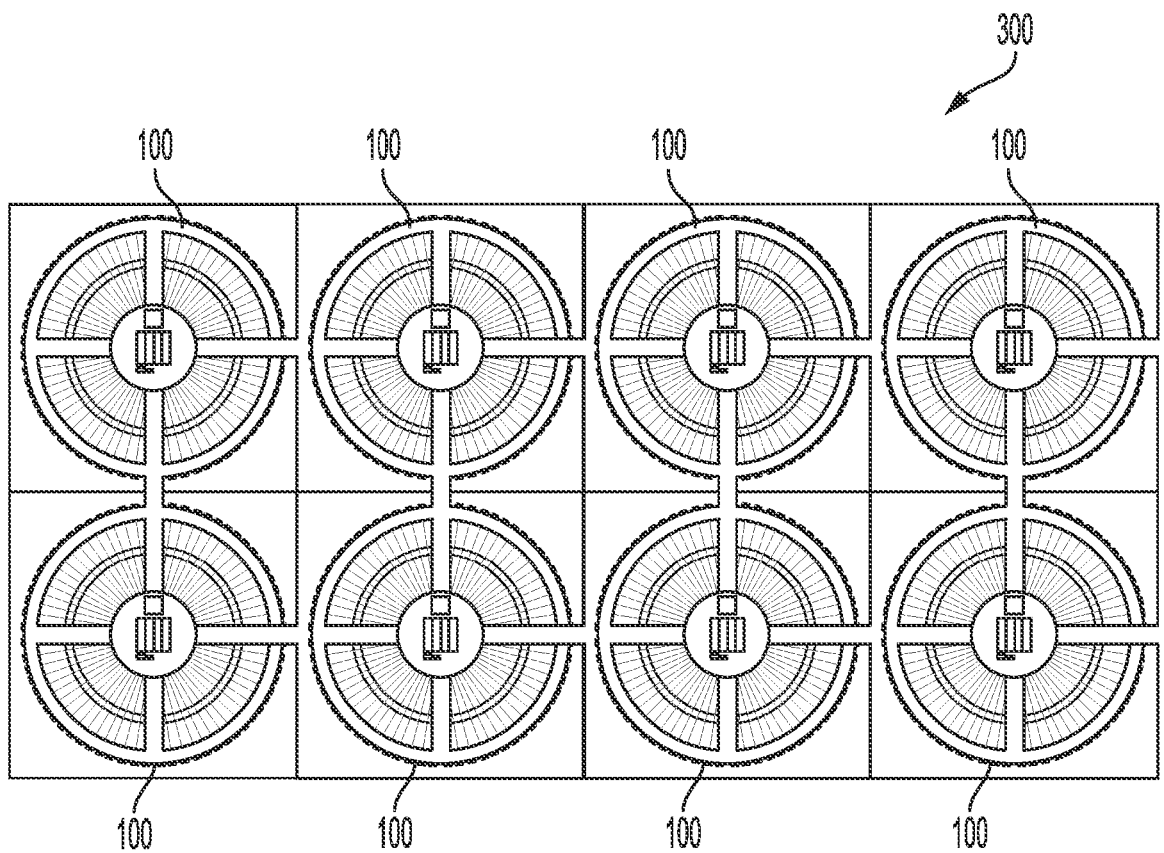

Illustrated in FIGS. 6A and 6B, the fish tanks 100,101,102 according to any of the embodiments described above may advantageously be arranged in a fish farm 300 comprising a plurality of tanks 100,101,102. This allows, for example, a common mooring system to be used, and also may allow technical functions to be shared between the tanks. For example, feed storage can be provided by one or a subset of tanks 100,101,102, fluid treatment systems in another, waste treatment and detritus storage in yet another, and so on. This optimises the overall operation and construction of the fish farm 300.

Fish tanks 100,101,102 or a fish farm 300 according to the embodiments described above may be used for different types of fish farming production cycles, for example for salmon smolt prior to it being moved to regular net pens, or for salmon farming during the full production cycle, such as to isolate the fish from the surrounding seawater for part of, or the full, production cycle. The fish tanks 100,101,102 may alternatively be used for temporary storage of fish, for example during harvesting. This may allow storage of live fish near the slaughtering process plant without adverse effects on the local environment and with isolation of the fish for hygienic or disease control purposes.

According to embodiments described herein, there is thus provided an improved fish tank and fish farm for farming of aquatic animals. The safety can be improved, for example through enhanced structural stability and the fact that damage to the outer hull of the tank will have less influence on the buoyancy properties and overall structural integrity of the tank. Moreover, enhanced operational flexibility is achieved with a fish tank or a fish farm according to embodiments described herein, with improved hygienic, environmental, and fish health properties, as well as reduced risk of fish escaping. By means of the closed tank, fish farms can be located closer to shore and/or in other locations which cannot accommodate fish farms according to current designs.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The present invention is not limited to the embodiments described herein; reference should be had to the appended claims.

The invention claimed is:

1. A floatable fish tank comprising:
   a hull having a lower part with side and bottom walls, the lower part forming an enclosure for fish;
   a deck arranged at an upper part of the hull;
   a central column fixed within the hull, wherein the central column is closed at its lower end section and extends from the bottom wall to the deck, wherein the central column comprises at least one working floor arranged therein; and
   operating equipment arranged on the at least one working floor.

2. The floatable fish tank according to claim 1, wherein the side and bottom walls are water tight.

3. The floatable fish tank according to claim 1, wherein the central column has at least one opening at its upper end section.

4. The floatable fish tank according to claim 3, wherein the at least one opening is a top opening arranged at an upper end of the central column.

5. The floatable fish tank according to claim 1, wherein the central column is designed to have a buoyancy in water which is higher than a weight of the fish tank.

6. The floatable fish tank according to claim 1, wherein the operating equipment comprises at least one of: a feed storage, a feed distribution system, a pump, a power generator, office utilities, a fluid conditioning system and a waste treatment system.

7. The floatable fish tank according to claim 1, wherein the deck comprises at least one opening.

8. The floatable fish tank according to claim 1, wherein the side wall and/or the bottom wall comprises an even inner surface and a strengthening frame and/or a double hull.

9. The floatable fish tank according to claim 1, comprising:
   a floatation element fixed to an outside surface of the upper part of the hull,
   a vessel docking element fixed to the outside surface of the upper part of the hull, or
   a combined floatation and vessel docking element fixed to the outside surface of the upper part of the hull.

10. The floatable fish tank according to claim 1, comprising a first pipe having a first opening to an outside of the hull and a second opening to the enclosure.

11. The floatable fish tank according to claim 10, wherein the first pipe extends at least partially inside the central column.

12. The floatable fish tank according to claim 10, wherein the first opening is located outside and below the hull.

13. The floatable fish tank according to claim 10, wherein the second opening is located in an upper region of the enclosure.

14. The floatable fish tank according to claim 10, comprising at least one of:
   a valve arrangement configured to control a fluid flow between the first opening and the second opening, or
   a pump arrangement configured to generate a fluid flow between the first opening and the second opening.

15. The floatable fish tank according to claim 10, comprising a second pipe having a third opening to an outside of the hull and a fourth opening to the enclosure.

16. The floatable fish tank according to claim 10, comprising:
   a second pipe having a third opening to an outside of the hull and a fourth opening to the enclosure,
   a first valve arrangement operable to lead a fluid flow between the first opening and either of the second opening or the fourth opening, and/or
   a second valve arrangement operable to lead a fluid flow between the third opening and either of the second opening or the fourth opening.

17. The floatable fish tank according to claim 15, wherein the second pipe extends at least partially inside the central column.

18. The floatable fish tank according to claim 17, wherein the fourth opening is located in a lower region of the enclosure.

19. A fish farm comprising a plurality of floatable fish tanks according to claim 1.

20. The floatable fish tank according to claim 1, comprising:
   a first pipe having a first opening to an outside of the hull and a second opening to the enclosure, wherein the first opening is located outside and below the hull; and
   at least one of:
      a floatation element fixed to an outside surface of the upper part of the hull,
      a vessel docking element fixed to the outside surface of the upper part of the hull, or
      a combined floatation and vessel docking element fixed to the outside surface of the upper part of the hull.

* * * * *